United States Patent Office 3,237,200
Patented Feb. 22, 1966

3,237,200
CARBOXYLIC ACID ESTERS
Ernst Herbert Barany, Farmakol. Inst., Universitetet, Uppsala, Sweden, and Jean François Miquel, ENSC Universite de Montpellier, Montpellier, France
No Drawing. Filed Oct. 22, 1962, Ser. No. 232,249
Claims priority, application Great Britain, Mar. 4, 1958, 6,913/58; Oct. 30, 1958, 34,802/58
11 Claims. (Cl. 260—479)

This invention relates to new chemical compounds having pharmacological activity comprising in particular the ability of inhibiting the secretion of gonadotrophins from the pituitary gland and accompanied by a favourably low oestrogenicity.

This application is continuation-in-part of an application having the Serial Number 796,204, filed on March 2, 1959, and now abandoned.

In the treatment of certain diseases using agents having an inhibiting effect on the secretion of gonadotrophins from the pituitary gland the agents used such as oestradiol and stilboestrol also have a very strong oestrogenic activity which may cause undesired side-effects such as feminization of male individuals. This oestrogenicity has in fact made it disadvantageous to use oestradiol and stilboestrol. Extensive investigations carried out by us have shown that said risk is eliminated only if the agents used fulfill certain requirements, viz. have a not too low pituitary inhibiting activity to eliminate the necessity of administering excessively high doses and at the same time have a high pituitary inhibiting activity in comparison to the oestrogenic activity. Said requirements are best expressed by means of a comparative index which is calculated according to the following formula (C.I.=comparative index):

$$\text{C.I.} = \frac{o}{p} : p = \frac{o}{p^2}$$

wherein $o$ means oestrogenic activity and $p$ means pituitary inhibiting activity and wherein the two activities are expressed as the dosage necessary to obtain a given effect on rats. When using said index due regard is paid both to the absolute pituitary inhibiting activity ($p$) and the specific pituitary inhibiting activity, i.e. the pituitary inhibiting activity relative to the oestrogenic activity ($o/p$). It has been found that the above-mentioned requirements are fulfilled if the comparative index is at least 15 and preferably at least 20.

Intensive investigations have shown that there are a number of 1,1-bis(p-OH-phenyl)-2,2-disubstituted ethylenes, their ethers and their esters which fulfill the above requirements. Said ethylenes correspond to the general formula

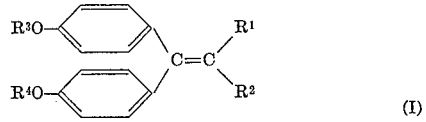
(I)

wherein $R^1$ is a member of the group consisting of methyl and ethyl radicals, $R^2$ is a member of the group consisting of straight and branched, alkyl and alkenyl radicals containing from three to five carbon atoms, and wherein $R^3$ and $R^4$ are similar and dissimilar members of the group consisting of hydrogen, alkyl radicals containing from one to six carbon atoms, alkenyl radicals containing from two to six carbon atoms and phenylalkyl radicals in which the alkyl radical is selected from the group consisting of straight and branched alkyl radicals containing from one to three carbon atoms, saturated and unsaturated, straight and branched alkane carbonyl radicals containing from one to eighteen carbon atoms, cyclopentane and cyclohexane carbonyl radicals, aromatic and araliphatic acyl radicals and radicals of carbonic, sulphuric and phosphoric acids.

$R^3$ and $R^4$ in the above general Formula I may be hydrogen atoms or one or both may be similar or dissimilar alkyl radicals containing from one to six carbon atoms, such as methyl, ethyl, propyl, isopropyl, n-butyl, tert.-butyl, n-amyl, isoamyl, for instance 2-methylbutyl, and cyclohexyl, alkenyl groups containing from two to six carbon atoms, such as allyl and crotonyl, or phenylalkyl groups in which the alkyl radical is straight or branched and contains from one to three carbon atoms, such as benzyl, phenethyl and phenylisopropyl.

One of the symbols $R^3$ and $R^4$ or both may also represent a saturated or unsaturated aliphatic acyl group containing from one to eighteen carbon atoms, such as formyl, acetyl, propionyl, pivaloyl, caproyl, palmitoyl, stearoyl, undecenoyl and oleyl, a cyclopentane carbonyl group or a cyclohexane carbonyl group, or an aromatic or araliphatic acyl group, such as a benzoyl or cinnamoyl group. One of the symbols $R^3$ and $R^4$ or both may also represent the acyl groups of polybasic organic acids such as succinic, maleic, tartaric, citric or hexahydrophthalic acid, or of carbonic, sulphuric or a phosphoric acid, such as orthophosphoric acid. In the case of said acyl groups of organic or inorganic polybasic acids the remaining free acid groups may be converted to the corresponding pharmacologically acceptable salts with alkali metals, such as with sodium and potassium, with alkaline earth metals, such as calcium or barium, or with ammonia or amines, such as an alkyl amine, e.g. methyl or ethyl amine.

The free acid groups alternatively may be converted to another suitable derivative such as an ester or an amide group.

Thus, in accordance with the above one of said $R^3O$— and $R^4O$— groups may be an etherified hydroxy group while the other is an esterified hydroxy group the compounds then being mixed mono-ether-mono-esters, wherein the ether and ester radicals are the same as those mentioned above.

The invention also includes all steric isomers comprised by the general Formula I.

The invention also includes a process for the preparation of the new compounds having the general Formula I. According to the invention said compounds are prepared by treating a compound having the general formula

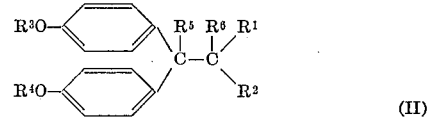
(II)

in which $R^1$, $R^2$, $R^3$ and $R^4$ are as hereinbefore defined and in which one of the symbols $R^5$ and $R^6$ is hydrogen and the other is selected from the group consisting of a hydroxy group and a hydroxy group esterified with an acid from the group consisting of lower aliphatic carboxylic acids containing from 1 to 6 carbon atoms, especially acetic acid, and mineral acids especially a hydrohalogenic acid, such as hydrochloric acid, or sulphuric acid, so as to split off a compound of the formula $R^5$—$R^6$ with the formation of a double bond between the carbon atoms to which $R^5$ and $R^6$ are attached.

The above-mentioned compounds having the general Formula II which are used as the starting material in the preparation of the ethylenes of the invention are novel compounds and are included within the scope of the invention. Said carbinols may be prepared in a manner known per se. A large number of methods for the preparation of tertiary carbinols of this kind and their esters are previously known. The carbinols are usually prepared in situ and most often need not be isolated in pure state but may be used directly for the preparation of the ethylenes of the invention. An example of a useful method is the reaction of ketones having the general formula

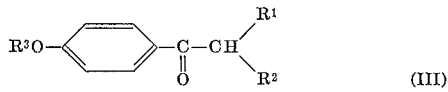

in which $R^1$, $R^2$ and $R^3$ are as hereinbefore defined, with a Grignard reagent having the general formula

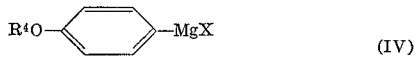

in which $R^4$ is as hereinbefore defined. There is thus formed a magnesium complex of the ketone and the Grignard reagent which is decomposed in conventional manner to form the desired carbinol for example by the addition of water or dilute acids, such as dilute hydrochloric acid. The carbinol thus formed need not be isolated in pure state in order to be possible to use in preparing the ethylenes of the invention. It is sufficient to recover the carbinol from the aqueous reaction mixture by extraction with a suitable organic solvent for the carbinol and partially or completely immiscible with water, and to evaporate the extract obtained. The extraction solvent may consist of a higher aliphatic alcohol, e.g. butyl alcohol or amyl alcohol, an ether, e.g. diethyl ether, dibutyl ether or tetrahydrofuran, a ketone, e.g. methyl isobutyl ketone or cyclohexanone, an aliphatic, cycloaliphatic or aromatic hydrocarbon, e.g. petroleum ether, ligroin, cyclohexane, methylcyclohexane, benzene, or toluene, or a halogenated aliphatic hydrocarbon, e.g. chloroform, carbon tetrachloride, dichloroethane or trichloroethylene. The extraction is preferably carried out at room temperature and the extract is then preferably dried, for example with anhydrous sodium sulphate or calcium sulphate. The carbinol is then isolated by evaporation and may be purified in conventional manner, for example by distillation or recrystallization, but is preferably used directly in the form of the evaporation residue as the starting material for preparing the ethylenes of the invention.

The process described gives a carbinol having the general Formula II, i.e. wherein one of the symbols $R^5$ and $R^6$ is a hydroxy group while the other is a hydrogen atom. Said carbinol is the most preferable starting material in the process of the invention. However, when $R^3$ and $R^4$ do not each represent a hydrogen atom some difficulty may arise in splitting of water from the carbinol to form the corresponding ethylene of the invention and it may therefore be more suitable to prepare a corresponding ester of the kind mentioned above, i.e. with a lower aliphatic acid or a mineral acid. Said esters are prepared in conventional manner without difficulty.

The above-mentioned evaporation of the extract of the carbinol formed may be carried out under various conditions as to time, temperature and pressure. These conditions are usually not critical in any manner but it is preferable to carry out the evaporation at relatively low temperatures and in vacuum, e.g. at a temperature up to about 50° C. at water pump vacuum. In certain cases, for example when the solvent employed for the extraction has a boiling point above 50° C. even in vacuum this temperature may be exceeded with accompanying dehydration of the carbinol. The dehydration is preferably carried out directly in the same vessel as can be seen from the following description.

Complete or partial dehydration may also occur when the above-mentioned organometal complex is decomposed by the use of strong acids and insufficient cooling. In this case the desired compound of Formula I is obtained in crude state or in the form of a mixture with the corresponding carbinol. The solvents used for the isolation of said reaction products may be the same as those used for the recovery of the pure carbinol in the manner described at item I.

According to a preferred embodiment of the invention the dehydration is carried out simply by continuing the heating of the residue obtained in the evaporation of the extract of the carbinol. In this case it is suitable to carry out the heating to a temperature between about 50 and 300° C. at atmospheric pressure or preferably in vacuum. Vacuum is suitably employed to assist in removing the water split off from the carbinol from the reaction vessel used, but the pressure to which the reaction vessel is evacuated is not critical in any manner. The dehydration by heating is usually carried out at a pressure of about 5 to 200 mm. of Hg, and preferably at water pump vacuum. The time necessary for dehydration varies according to the quantity of carbinol to be dehydrated but the dehydration should preferably be carried out as fast as possible for instance during a period of from about one to about thirty minutes. In this manner undesirable side reactions are avoided. Any usual distillation equipment may be used for performing the dehydration. However, if the quantity of carbinol to be dehydrated is relatively large a period of time of up to about two hours or more would be necessary. In that case it is more convenient to use a special evaporation apparatus for continuous dehydration where only heating for a short time of the flowing liquid is necessary.

The dehydration may be facilitated by the addition of various materials, such as sulfuric acid, phosphoric acid, phosphorous pentoxide in boiling benzene, alkali metal hydrogen sulphates, e.g. sodium and potassium hydrogensulphate, potassium pyrosulphate, iodine in xylene, hydrogen bromide in acetic acid, p-toluenesulphonic acid, sulphamidic acid, formic acid, acetic acid and anhydrides of lower aliphatic carboxylic acids containing from one to six carbon atoms, e.g. acetic anhydride, and also the corresponding acyl chlorides, e.g. acetyl chloride. The dehydration may also be carried out in aqueous to alcoholic alkai solutions, such as potassium or sodium hydroxide dissolved in water or lower alcohols having one to six carbon atoms or with the corresponding lower potassium or sodium alkoxylates.

The desired ethylene compounds of the invention thus formed may be isolated in any conventional manner, such as by distillation at a pressure of for instance 0.001 to 5 mm. of Hg and most preferably at a pressure of from about 0.01 to about 0.2 mm. of Hg. The product may then be further purified by reprecipitation or recrystallization. The desired compounds having Formula I are obtained as liquids or as solids in good yield and in a pure state.

The product thus obtained may be a mono or dialkyl ether. According to a further embodiment of the invention the alkyl radicals may be removed in conventional manner, preferably by reacting the ether with a nucleophilic agent, such as an alkali metal hydroxide, e.g. sodium and potassium hydroxide. The reaction is conveniently carried out in the presence of a polar organic solvent, such as lower alcohols having one to eight carbon atoms, e.g. methanol and ethanol, or in glycol ethers, e.g. triethylene glycol, in aqueous to anhydrous state at increased temperatures and preferably at a temperature of from about 150 to about 250° C. The pressure to be used of course depends on the solvent used. The lower alcohols may be used in an autoclave but the triethylene glycol can be used at atmospheric pressure. The dealkylated compounds of the invention thus obtained, i.e. the free p,p'-dihydroxy compounds, may be isolated, in the following manner.

The reaction mixture is diluted with water and neutralized with a suitable acid for example hydrochloric acid, acetic acid and the like. The ethylene compound can be extracted with an organic solvent of the group described in connection with the isolation of the corresponding carbinol of Formula II. Upon drying the solution, for instance with anhydrous sodium sulphate or magnesium sulphate the solvent may be removed by distillation and the ethylene compound may be distilled at reduced pressure, preferably at about 0.001 to 0.1 mm. of Hg. The dihydroxy compounds thus obtained may also be recrystallized from suitable solvents.

According to still another embodiment of the invention the monoalkyl ethers and the free p,p-dihydroxy compounds corresponding to the general Formula I are esterified in conventional manner to form the corresponding mono and di-esters, resp., and especially to form pharmacologically acceptable mono and di-esters.

For purification or other purposes the invention also includes the preparation of the monoalkyl ethers and the free p,p-dihydroxy compounds corresponding to the general Formula I by hydrolysis of the corresponding mono and di-esters, resp. Said hydrolysis may be carried out in conventional manner and may for instance comprise a saponification of the ester by heating the same with an alcoholic, e.g. methanolic sodium or potassium hydroxide solution. The monoalkyl ether or free p,p-dihydroxy compound thus obtained may then be precipitated, such as with concentrated or dilute hydrochloric acid, recovered by filtration, washed with water and recrystallized from suitable solvents, such as benzene, toluene, toluene-methanol or methanol-water.

In the preparation of the esters of organic mono and polybasic aliphatic, cycloaliphatic and aromatic carboxylic acids it is possible to use the acids themselves. However, the corresponding acyl chlorides and anhydrides are preferably used. The esterification may be carried out in the presence of usual esterification catalysts, such as mineral acids, e.g. sulphuric acid, p-toluenesulphonic acid, cation exchange resins containing sulphonic acid radicals, and the like. The esterification may be carried out in a suitable organic solvent, such as pyridine, if desired.

As examples of suitable acids for the preparation of pharmacologically acceptable esters of the invention there may be mentioned sulphuric acid and orthophosphoric acid, formic acid, acetic acid, propionic acid, phenylpropionic acid, butyric acid, iso-butyric acid, tert.-butylacetic acid, caproic acid, caprylic acid, capric acid, palmitic acid, stearic acid, benzoic acid, succinic acid, glutaric acid, ethoxyacetic acid, ethylmercaptoacetic acid, lactic acid, tartaric acid, citric acid, hexahydrophthalic acid, pivalic acid and the like. Esters with polybasic acids containing free acid groups may be converted to the corresponding pharmacologically acceptable salts as mentioned above.

The esters may be isolated in the same manner as the corresponding dihydroxy compounds. The reaction mixture is treated with water and the ester is extracted with a suitable solvent, selected from the group used in the isolation of the carbinols of Formula II. The solution is dried and evaporated whereupon the residue obtained is rectificated in vacuum preferably at a pressure of from about 0.01 to 0.1 mm. of Hg. Upon distillation the ester can also be recrystallized from suitable solvents so as to obtain the product in a purer state, if necessary.

In accordance with the statements made above the present invention comprises the following groups of compounds:

(1) Compounds of the general Formula I wherein each phenyl group contains a free hydroxy group in the p-position.

(2) Mono and diesterified p,p'-dihydroxy compounds of the general Formula I.

(3) Mono and dietherified p,p'-dihydroxy compounds of the general Formula I.

(4) Monoesterified-monoetherified p,p'-dihydroxy compounds of the general Formula I.

(5) Mono and di-esters of p,p'-dihydroxy compounds of the general Formula I with polybasic acids in which remaining free acid radicals may have been converted to the corresponding salts with alkali metals, alkaline earth metals, ammonia or an amine or to an ester with a suitable alcohol, especially a lower aliphatic alcohol, such as methanol and ethanol and the like, or to an amide with ammonia or a lower aliphatic amine.

(6) Compounds having the general Formula II, wherein the p,p'-hydroxy groups may be free or converted to other derivatives as stated above at items 2–5.

As examples of especially suitable compounds of the invention there may be mentioned those to be seen from the following table wherein also the above-mentioned index $o/(p)^2$ is stated. The compounds correspond to Formula I above and only the symbols $R^1$ and $R^2$ are stated in the table. To simplify the comparison $R^3$ and $R^4$ in Formula I are the same (acyl radicals).

Table 1

| Formula I | | Index $o/(p)^2$ |
|---|---|---|
| $R^1$ | $R^2$ | |
| Methyl | Propyl | 40 |
| Do | Isopropyl | 25 |
| Do | Propenyl | 65 |
| Do | Butyl | 20 |
| Do | Isoamyl | 20 |
| Ethyl | Propyl | 180 |
| Do | Isopropyl | 170 |
| Do | Butyl | 25 |
| Do | Isoamyl | 20 |

The British patent specification No. 537,976 discloses the preparation of compounds having the same general formula as the compounds of this invention but does not specifically describe the special group of compounds falling under the definition of the general Formula I stated above. The selective character of this invention is clearly seen from the fact that compounds falling just outside the scope of Formula I as hereinbefore defined, viz. compounds in which $R^1$ and $R^2$ are both methyl, both ethyl, both propyl or in which $R^1$ is methyl and $R^2$ ethyl or $R^1$ is propyl and $R^2$ is isoamyl all have a lower index than 15.

Investigations of the physiological activity of these compounds have shown that they may have a valuable oestrogenic as well as an anti-oestrogenic effect possibly due to competitive antagonism. This behaviour is for example shown by a representative example of the new compounds, viz. 1,1-bis(p-hydroxyphenyl)-2-ethyl-2-propyl ethylene, and its esters. The oestrogenic effect of this compound differs from that of the previously known oestrogens in that it is more limited in character which may be an important property in certain applications. The known oestrogens stimulate the male accessory sexual glands, for example the seminal vesicles of rodents. At doses which give equal inhibition of the pituitary this is the case to a much smaller degree with 1,1-bis(p-hydroxyphenyl)-2-ethyl-2-propyl ethylene. The maximum growth attainable in certain organs under the action of this compound of the invention is less than that of the usual oestrogens. This fact makes 1,1-bis(p-hydroxyphenyl)-2-ethyl-2-propyl ethylene better suited for uses in which the pituitary inhibiting effect and the anti-androgenic effect thereof are of primary importance.

The therapeutically active compounds of the invention may be administered as such or together with suitable carriers which are pharmacological acceptable. The carrier is selected according to the route of administration to be used as well as according to the physical properties of the compounds and standard pharmaceutical practice.

For oral administration the compounds may be administered in the form of tablets containing usual excipients and fillers such as starch, milk sugar and the like. Aqueous suspensions and elixirs may also be used and may contain usual sweetening and flavouring agents. In the treatment of some conditions the compounds may also be used in the form of topical compositions prepared by the use of conventional ointment and salve bases.

The compounds may also be administered parenterally the dosage forms being prepared according to standard pharmaceutical practice. The invention includes within its scope also pharmaceutical compositions prepared from the compounds of the invention and carriers or excipients of the above-mentioned kind.

The inventions is further illustrated by way of the following specific examples which, however, are not to be construed as limiting the invention in any manner. The general methods of preparing the compounds of the invention is first illustrated and physical properties of representative compounds thus prepared are stated in a following table.

I. PREPARATION OF BIS(p-METHOXYPHENYL)-ETHYLENES OF FORMULA I

To a Grignard-solution (prepared from 1.1 moles of magnesium turnings, 1.0 mole of p-methoxyphenyl bromide and 200 mls. of dry ether) in a three-necked flask equipped with a reflux condenser, a dropping funnel and a sealed stirrer was added 1.0 mole of a ketone of the general Formula III in the form of a solution in 100 mls. of dry ether during a period of about 30 minutes. Upon boiling for one hour under vigorous stirring the Grignard complex was decomposed with 5 N sulphuric acid. The ether layer was separated, washed with an aqueous saturated sodium chloride solution and dried over anhydrous sodium sulphate. The ether was removed by evaporation and the bis(p-methoxyphenyl)ethylene thus formed was distilled in vacuum as an oil and was purified by redistillation or recrystallization. Representative compounds thus prepared and their physical data are stated in the following Table A.

Table A

| Name | Boiling point in ° C. at mms. of Hg (uncorr.) | $n_D^{25°}$ |
|---|---|---|
| 1,1-bis(p-methoxyphenyl)-2-methyl-2-n-propyl ethylene | 171–173/0.8 | 1.5733 |
| 1,1-bis(p-methoxyphenyl)-2-methyl-2-isopropyl ethylene | 167–168/0.7 | 1.5733 |
| 1,1-bis(p-methoxyphenyl)-2-methyl-2-butene-(2)-yl ethylene | 143/0.05 | 1.5854 |
| 1,1-bis(p-methoxyphenyl)-2-methyl-2-n-butyl ethylene | 184/0.8 | 1.5681 |
| 1,1-bis(p-methoxyphenyl)-2-ethyl-2-n-propyl ethylene | 176/0.7 | 1.5656 |

II. PREPARATION OF BIS-(p-HYDROXYPHENYL)-ETHYLENES OF FORMULA I BY DEALKYLATION OF THE CORRESPONDING BIS-p-METHOXYPHENYL) ETHYLENES OF FORMULA I 0.35 mole of a bis(p-methoxyphenyl)-ethylene of the general Formula I, 100 gms. of potassium hydroxide pellets and 400 mls. of triethylene glycol were mixed in a three-necked flask equipped with an eight inches high glass tube, a sealed stirrer and a contact thermometer adjusted on 210° C. The mixture was heated by means of an electric heating mantle and was maintained at 210° C. for three hours. Upon cooling to room temperature the dark-brown mixture was poured into 1,000 mls. of water, extracted with ether and acidified with 5 N hydrochloric acid. The dark-brown oil which separated was taken up into ether, washed with a saturated aqueous sodium chloride solution to neutral reaction and was dried over anhydrous sodium sulphate. The ether was removed by evaporation and the residue was distilled in high-vacuum. The free phenol thus obtained was recrystallized from an organic solvent. The solvents used and the melting points of representative compounds thus prepared are stated in the following Table B.

Table B

| Name | Solvents for recrystallization | Melting point in ° C. (corr.) |
|---|---|---|
| 1,1-bis(p-hydroxyphenyl)-2-methyl-2-n-propyl ethylene. | Toluene plus methanol | 173–174 |
| 1,1-bis(p-hydroxyphenyl)-2-methyl-2-isopropyl ethylene. | Methanol plus water | 191–192 |
| 1,1-bis(p-hydroxyphenyl)-2-methyl-2-butene-(2) ethylene. | do | 160–162 |
| 1,1-bis(p-hydroxyphenyl)-2-ethyl-2-n-butyl ethylene. | Toluene | 146–147 |
| 1,1-bis(p-hydroxyphenyl)-2-n-propyl ethylene. | Benzene | 174–175 |

III. PREPARATION OF BIS-(p-ACETOXYPHENYL)-ETHYLENES 100 gms, of a bis(p-hydroxyphenyl)-ethylene of the general Formula I were admixed with 250 mls. of acetic anhydride and a trace of concentrated sulphuric acid were added to the residue. The reaction mixture which immediately became warm was heated for 30 minutes on a steam-bath. Upon cooling the mixture was poured into water. The acetylated compound which separated as an oil was taken up into ether and washed twice with a saturated aqueous sodium chloride solution. The solvents were removed by evaporation and the bis(p-acetoxyphenyl)-ethylene thus obtained was distilled and recrystallized from ethanol. The melting points and U.V. absorption data of representative compounds thus prepared are stated in the following table C.

Table C

| Name | Melting point in ° C. (corr.) | U.V. absorption | |
|---|---|---|---|
| | | $\lambda_{max}m\mu$ | $\epsilon \times 10^{-4}$ |
| 1,1-bis(p-acetoxyphenyl)-2-methyl-2-n-propyl ethylene | 74–75 | 245 | 1.60 |
| 1,1-bis(p-acetoxyphenyl)-2-methyl-2-isopropyl ethylene | 125–126 | 243 | 1.57 |
| 1,1-bis(p-acetoxyphenyl)-2-methyl-2-butene-(2)-yl ethylene | 144–146 | 282 | 2.03 |
| 1,1-bis(p-acetoxyphenyl)-2-methyl-2-n-butyl ethylene | 84–85 | 245 | 1.61 |
| 1,1-bis(p-acetoxyphenyl)-2-ethyl-2-n-propyl ethylene | 71–72 | 242 | 1.50 |

IV. PREPARATION OF BIS(p-HYDROXYPHENYL)-ETHYLENES OF FORMULA I 0.015 mole of a pure bis(p-acetoxyphenyl)-ethylene was saponified on the steam-bath with 50 mls. of 20% methanolic potassium hydroxide solution for 30 minutes. The free phenol thus obtained was precipitated with 2 N hydrochloric acid, recovered by filtration, washed with water and recrystallized, e.g. from the solvents stated in Table B above.

V. PREPARATION OF 1,1-BIS(p-METHOXYPHENYL)-2-ETHYL-PENTANOL AND 1,1 - BIS(p - METHOXYPHENYL) - 2 - ETHYL - 2 - n - PROPYL ETHYLENE

A solution of 22 gms. of p-methoxy-2-ethyl-valerophenone in 100 mls. of dry ether was added dropwise under stirring and cooling to 100 mls. of a Grignard-solution prepared from 20.6 gms. of p-methoxyphenyl bromide, 2.7 gms. of magnesium and 100 mls. of ether. The mixture was stirred for further 12 hours at 20° C. and was then poured into an ice-cooled saturated aqueous ammonium chloride solution. The liberated alcohol, viz. 1,1-bis(p-methoxyphenyl)-2-ethyl-pentanol, is obtained in the ether phase. Upon drying over anhydrous sodium sulphate the solution was evaporated at room temperature to a volume of 50 mls. To the concentrated solution thus obtained there were then added dropwise 7.9 gms. of acetyl chloride the hydrogen chloride formed being neutralized by the addition of triethylamine (altogether 10 gms. were added). Upon completion of the reaction the ethereal solution was washed thoroughly with water and was then dried and evaporated. The oil thus formed was distilled in a high vacuum. In the degassing a smaller fore-run was obtained. The main fraction distilled at 75–80° C./0.001 mm. of Hg. Yield 20 gms. The product showed $n_D^{25°}$ 1.5764. Calculated for the acetate: C 74.56 and H 8.16%. Found: C 74.3 and H 8.22%.

10 gms. of the acetate thus prepared were boiled with 200 mls. of 1 N methanolic potassium hydroxide solution for half an hour. The mixture was poured into water and the 1,1-bis(p-methoxyphenyl) - 2 - ethyl - 2-n-propyl ethylene thus formed was isolated as described above. Yield 8 gms. The product consisted of an oil having the boiling point 176° C. at 0.7 mm. of Hg and $n_D^{23°}$ 1.5656.

VI. PREPARATION OF DISODIUM 1,1 - BIS(p-HYDROXYPHENYL)-2-METHYL-2-PROPYL ETHYLENE DISULPHATE

To a well stirred mixture of 12 mls. of chlorosulphonic acid and 60 mls. of pyridine, cooled to −10° C., was added a solution of 15.0 gms. of 1,1-bis(p-hydroxyphenyl)-2-methyl-2-propyl ethylene in 20 mls. of pyridine. The reaction temperature was kept below 0° C. during the addition, whereupon the mixture was heated to 30–40° C. for 1 hour and then poured into a saturated solution of sodium bicarbonate in water. The aqueous phase was washed with ether, filtered and neutralized with dilute hydrochloric acid. The precipitated substance was sucked off, washed with water and recrystallized from water. It was the pyridine salt of the disulphate. This salt was dissolved in 40 mls. of 1 M sodium hydroxide. The solution was filtered and diluted with 1 litre of acetone and 1 litre of ether. The sodium salt crystallized as long needles which were sucked off and washed with ether. The yield was 17 gms.

What we claim is:
1. A compound of the formula:

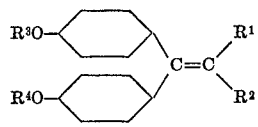

wherein $R^1$ is a member of the group consisting of methyl and ethyl, $R^2$ is a member of the group consisting of alkyl and alkenyl radicals containing from three to five carbon atoms, and $R^3$ and $R^4$ are members of the group consisting of alkane carbonyl radicals containing from one to eighteen carbon atoms.

2. The compound of claim 1 wherein $R^3$ and $R^4$ are acetyl.
3. Compounds according to claim 1 in which $R^1$ is methyl and $R^2$ is propyl.
4. Compounds according to claim 1 in which $R^1$ is methyl and $R^2$ is isopropyl.
5. Compounds according to claim 1 in which $R^1$ is methyl and $R^2$ is propenyl.
6. Compounds according to claim 1 in which $R^1$ is methyl and $R^2$ is butyl.
7. Compounds according to claim 1 in which $R^1$ is methyl and $R^2$ is isoamyl.
8. Compounds according to claim 1 in which $R^1$ is ethyl and $R^2$ is propyl.
9. Compounds according to claim 1 in which $R^1$ is ethyl and $R^2$ is isopropyl.
10. Compounds according to claim 1 in which $R^1$ is ethyl and $R^2$ is propenyl.
11. Compounds according to claim 1 in which $R^1$ is ethyl and $R^2$ is butyl.

References Cited by the Examiner

UNITED STATES PATENTS 2,231,936  2/1941  Medick _____ 260—463
2,802,854  8/1957  Arnold.
2,971,975  2/1961  Dawson.

FOREIGN PATENTS 537,976  7/1941  Great Britain.

OTHER REFERENCES

Fieser et al.: "Organic Chemistry," 3rd ed., pages 57 and 58 (1956).

Mentzer et al.: Compt. rend., vol. 222, pages 1004–1006 (1946).

Migrdichian: "Organic Synthesis," vol. II, pages 835–837 (1957).

Miquel: Acta Chem. Scand., vol. 12, pp. 274–280 (1958).

Tadros et al.: J. Chem. Soc. (London), vol. of 1951, pages 2553–2556.

Tarbell et al.: J.A.C.S., vol. 68, pages 1930–1932 (1946).

Wessely et al.: C.A., vol. 35, pages 1779–1781 (1941).

Xuong et al.: J. Chem. Soc. (London), vol. of 1952, pages 3741–3744.

CHARLES B. PARKER, *Primary Examiner.*